United States Patent [19]

Huang

[11] 4,160,634

[45] Jul. 10, 1979

[54] AUTOMATIC DUMPLING MAKING MACHINE

[76] Inventor: Te-Hsiu Huang, 79 Lane 225, Sec. 1, Chung-Hua Rd., Taichung, Taiwan

[21] Appl. No.: 826,210

[22] Filed: Aug. 19, 1977

[51] Int. Cl.² ............................ A21C 9/06; A21C 9/08
[52] U.S. Cl. .................................... 425/112; 99/450.6
[58] Field of Search .................. 99/450.6, 450.1, 494; 425/395, 112, 127, 96, 363; 101/425; 15/256.52; 53/183, 184 R; 222/271, 135

[56] References Cited

U.S. PATENT DOCUMENTS

| | | | |
|---|---|---|---|
| 1,236,998 | 8/1917 | Tommasini | 99/450.6 |
| 2,681,089 | 6/1954 | Francisco | 99/494 |
| 2,855,867 | 10/1958 | Zeitlin | 99/450.6 |
| 3,633,517 | 1/1972 | Kao | 99/450.6 |
| 4,014,254 | 3/1977 | Ohkawa | 99/450.6 |

FOREIGN PATENT DOCUMENTS 1265559 4/1968 Fed. Rep. of Germany ........... 425/112

*Primary Examiner*—Harvey C. Hornsby
*Assistant Examiner*—Timothy F. Simone
*Attorney, Agent, or Firm*—Wolder, Gross & Yavner

[57] ABSTRACT

An automatic dumpling making machine substantially comprising a transmission mechanism for dough sheets thickness control and delivery, a flour container for containing flour to be applied over the dough sheets, stuffing control and feeding devices for feeding a fixed amount of stuffings into each of the dough sheets, a plurality of dumpling forming devices mounted on the peripheral surfaces of two polygon-shaped rotating wheels for folding up the dough sheets after stuffings have been fed in to form a dumpling, and a pushing rod for pushing the finished dumplings out of the forming devices into a dumpling collector.

10 Claims, 10 Drawing Figures

AUTOMATIC DUMPLING MAKING MACHINE

BACKGROUND OF THE INVENTION

The present invention relates to an automatic dumpling making machine.

Dumpling is a very popular Chinese food. Traditional way of making dumplings is to first manually put a proper amount of stuffings on a piece of dough sheet, then cut the sheet into a suitable size or shape, and finally fold the sheet up to form a dumpling. Dumplings produced in this way may undesirably become too large or too small because the amount of stuffings to be put in is difficult to control, and the thickness of the dough sheets is not constant. Furthermore, the traditional way of making dumplings by hands is unsanitary and inefficient. It may take, for instance, half an hour or so to complete dumplings for a serving of two. With the fast growing demand for dumplings, an automatic dumpling making machine is indeed in great need.

SUMMARY OF THE INVENTION

The primary object of the present invention is to provide an automatic dumpling making machine wherein a series of operations required to complete a dumpling such as dough sheets delivery, stuffings feeding, dough sheets cutting and folding, and dumpling product removing etc. are performed automatically.

Another object of the present invention is to provide an automatic dumpling making machine wherein the thickness of dough sheets and the amount of stuffings to be fed in can be readily controlled.

Still another object of the present invention is to provide a compact automatic dumpling making machine which is efficient and sanitary in making dumplings and consumes very little power.

Other objects and advantages will become apparant from the following detailed description of the present invention with reference to the accompanying drawings.

DESCRIPTION OF PREFERRED EMBODIMENT

Figure 1:
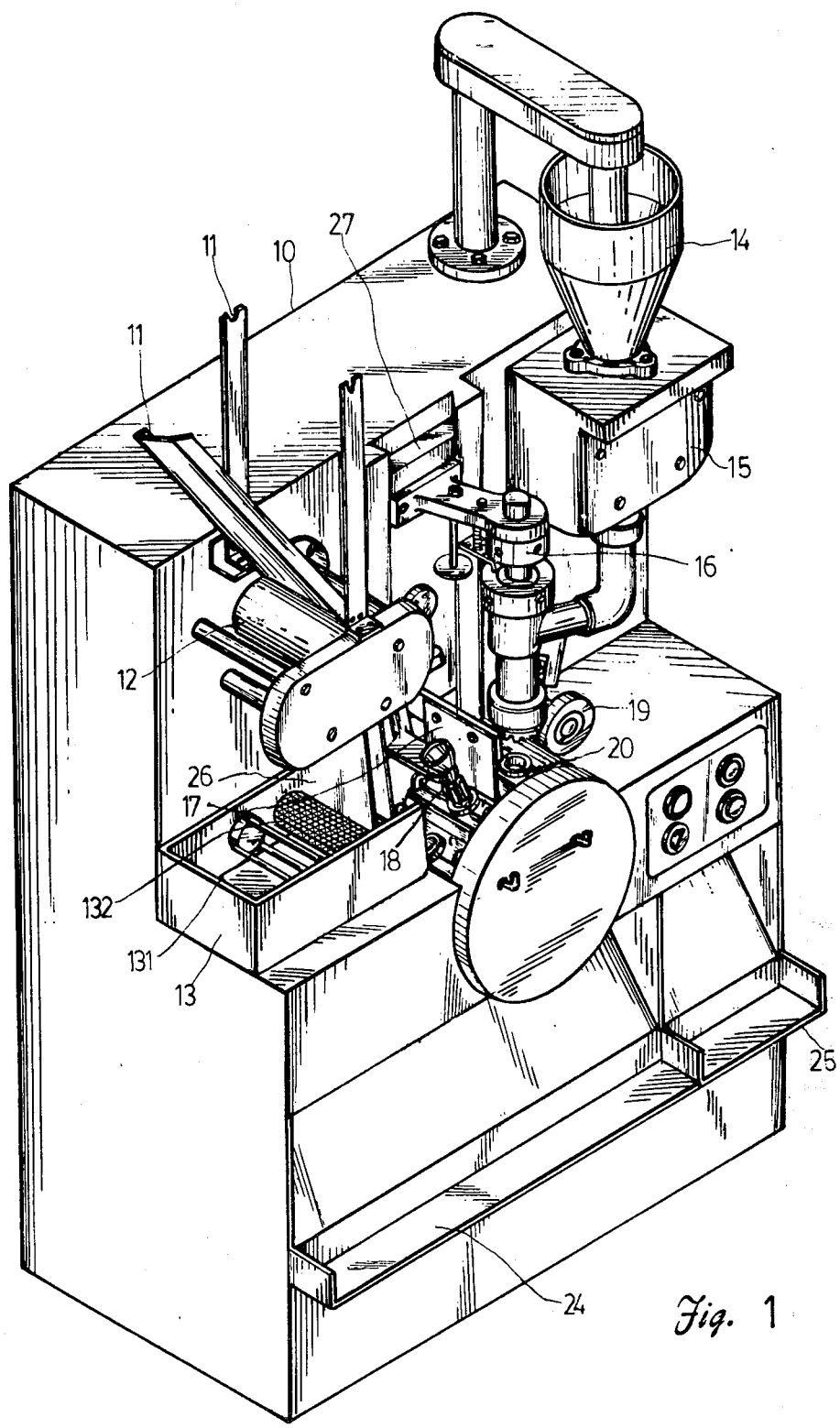
FIG. 1 is a perspective view of the automatic dumpling making machine according to the present invention.
Figure 2:
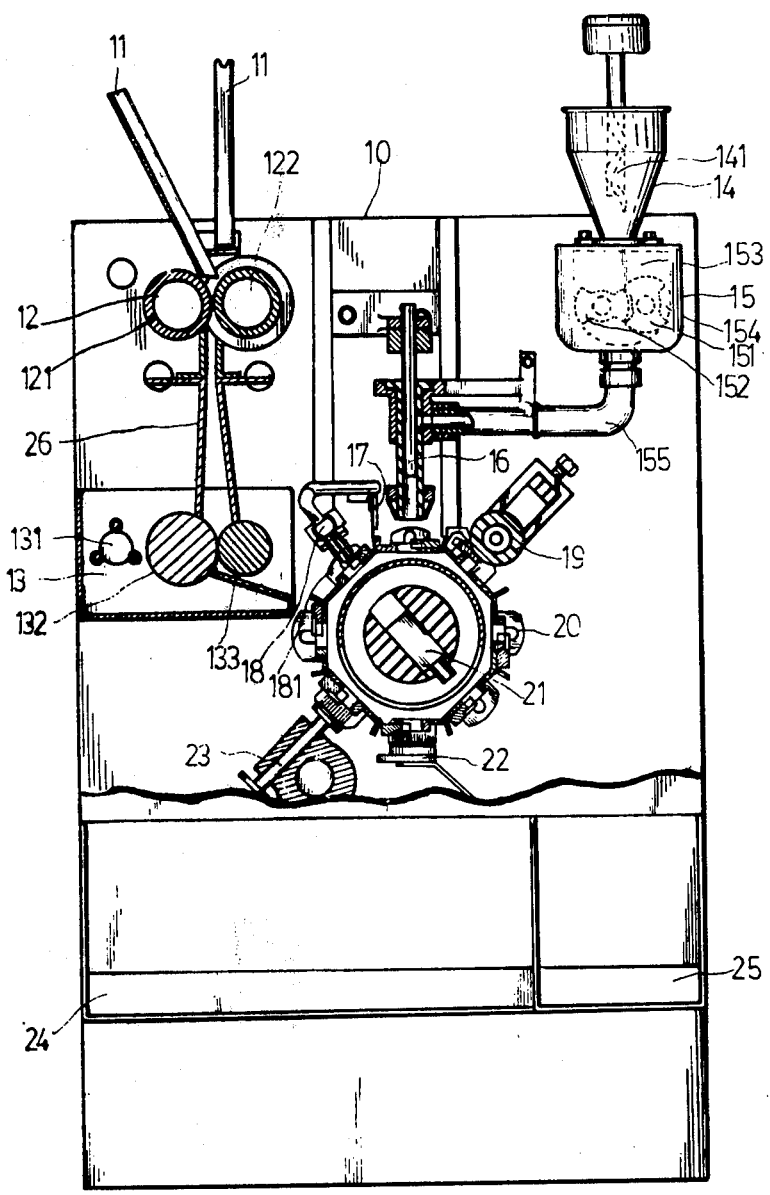
FIG. 2 is a front view of the automatic dumpling making machine according to the present invention.

FIGS. 1 and 2 show respectively the perspective and the front views of the automatic dumpling making machine according to the present invention. The automatic dumpling making machine 10 substantially comprises a dough sheets holder 11 for holding dough sheets to be used; a transmission mechanism 12 for transmitting dough sheets; a flour container 13 for containing flour to be applied over the dough sheets; a stuffing hopper 14 for storing stuffings and later dispensing them through a stuffing controller 15 to a stuffing feeding device 16; a cutting device 17 for cutting the dough sheets into a proper shape and size; a hitting device 18 for hitting the central part of the dough sheet to form a dent for receiving stuffings; a pressing wheel 19 for forcing a dumpling forming device 20 to fold up the dough sheet after stuffings have been fed into the sheet to form a dumpling; a pushing rod 21 connected to the forming device 20 for pushing the finished dumplings out of the forming device into a dumpling collector 24; a fixed brush 22 and a movable brush 23 for cleaning the forming device 20 everytime after a dumpling is completed; and a dough sheet collector 25 for collecting the remaining dough sheets.

The process of making dumplings by means of the automatic dumpling making machine 10 is described below with reference to FIG. 2. The dough sheets stored in the holder 11 are transmitted through a pair of wheels 121 and 122 of the transmission mechanism 12 and a confining plate 26 into the flour container 13. The wheels 121 and 122 are oppositely arranged so that the thickness of the dough sheets passing therethrough is made constant. Provided in the flour container 13 are a stirrer 131 for stirring the flour in the container, a wheel 132 having a zigzagged outer surface, and a wheel 133 located opposite to the wheel 132. When a dough sheet passes through the space between the two wheels 132 and 133, a proper amount of flour will be applied over the back surface of the dough sheet for preventing the same from sticking to the dumpling forming device 20 later. After exiting from the flour container 13, the dough sheet is placed on the forming device 20. The hitting device 18 then hits with its one enlarged end 181 the central part of the sheet to form a dent for filling in stuffings. In the meantime, the cutting device 17 cuts the dough sheet into a proper shape. A fixed amount of stuffings is fed from the hopper 14 through the amount controller 15 into the dent on the sheet. The pressing wheel 19 then forced the forming device 20 to fold up the dough sheet to form a dumpling. The dumpling is then pushed by the pushing rod 21 out of the forming device into the dumpling collector 24. The forming device 20 is cleaned by brushes 22 and 23, and is then ready for receiving the next sheet. This process repeats until all the dough sheets in the holder 11 are used up. According to the present invention, there is a set of eight identical forming devices which are to be detailed later.

Referring to FIG. 2, a screw feeder 141 is provided in the stuffing hopper 14 for constantly driving the stuffings downward. Two rollers 151 and 152 shaped as illustrated in FIG. 2 are provided in the stuffing controller 15 so that when the two rollers rotate through a predetermined angle the stuffings accumulated in the upper part 153 of the controller are squeezed into the lower part 154 of the same and then enter the feeding device 16 through a guide tube 155.

Figure 3:
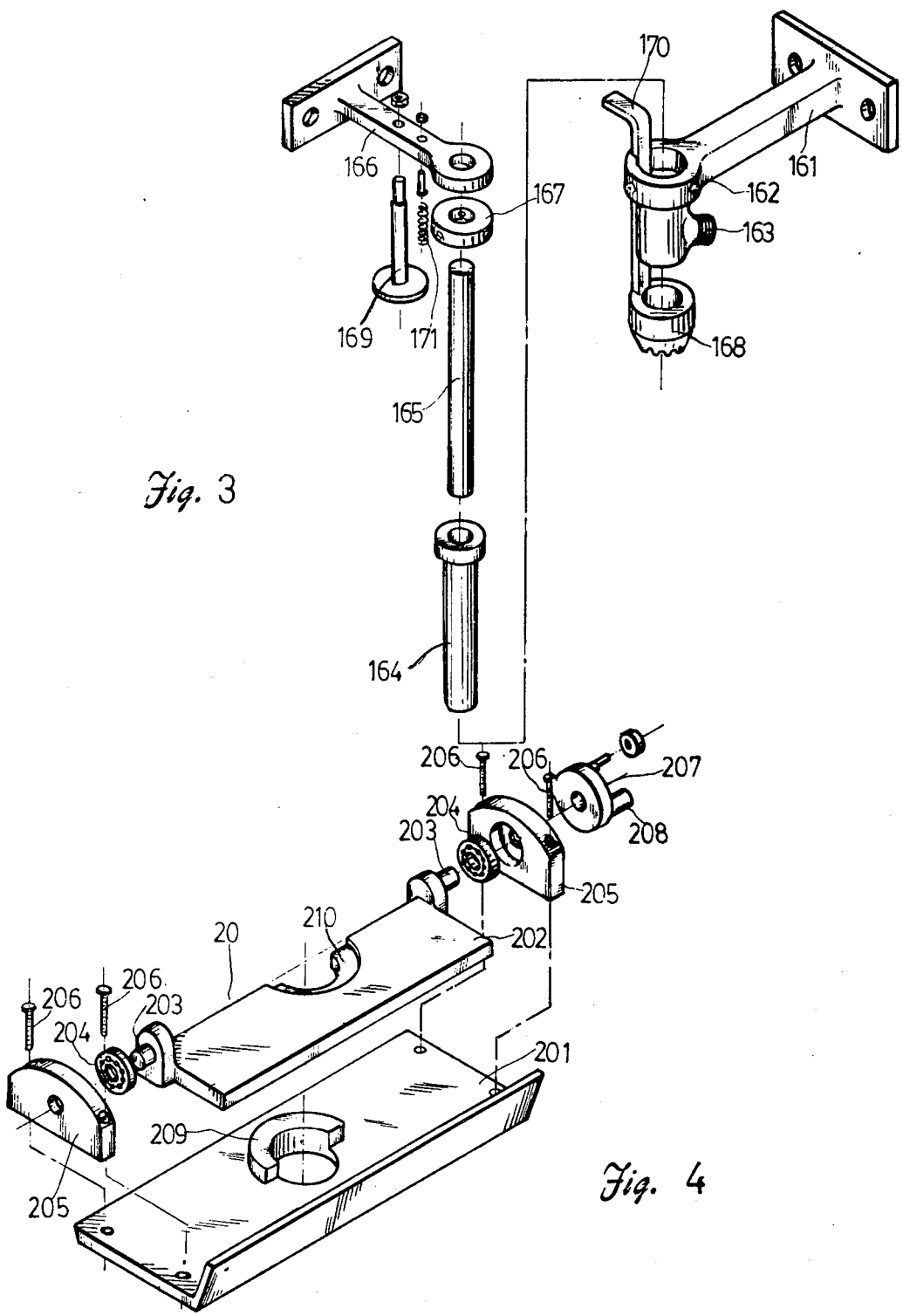
FIG. 3 is an exploded perspective view of a stuffing feeding device according to the present invention.

FIG. 3 shows an exploded perspective view of the feeding device 16 according to the present invention. The feeding device 16 is secured through a first support 161 to the outer surface of the forming device 20. One end of the support 161 is formed into a ring 162 for receiving a stuffing guide pipe 164 which in turn receives a feed rod 165. The feed rod 165 is connected to one end of a second support 166 by means of a ring nut 167. The other end of the second support 166 is fixed to a vertically slidable plate 27 (shown in FIG. 1) and is therefore allowed a vertical movement. In this manner, the feed rod 165 is capable of an up and down motion whereby driving a fixed amount of stuffings from the hpper 14 through the piep 164 into the dent on the dough sheet.

In order to be able to completely remove the sticky stuffings from the feed rod 165, a ladle-shaped stuffing remover 168 having a claw portion is also provided in the feeding device with an elongated handle thereof received in a recess preformed on the peripheral wall of the ring 162. The upper end of the handle 170 is bent 90 degree and rested on a plate 169 screw connected to the second support 166. In this way, the plate 169 together with the ladle-shaped stuffing remover may be carried by the slidable plate 27 to perform a vertical motion. A spring device 171 is further provided to accelerate the downward movement of the stuffing remover 168.

Figure 4:
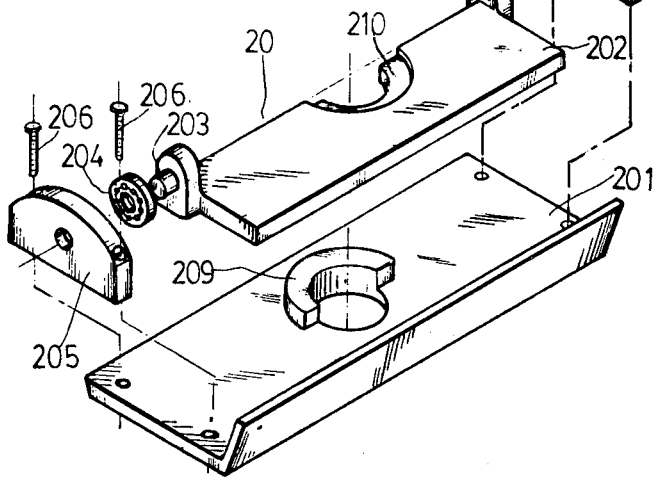
FIG. 4 is an exploded perspective view of a dumpling forming device according to the present invention.

FIG. 4 shows an exploded perspective view of one of the set of eight forming devices 20 according to the present invention. The forming device 20 comprises a set of two dies, a fixed lower die 201 and a rotatable upper die 202. The upper die 202 can rotate about axes 203 located on one side thereof, and is connected to the side walls 205 of the forming device through roller bearings 204. The upper and lower dies are locked together at one side by means of screws 206, and the entire assembly is connected to two octagon rotating wheels to be detailed in FIGS. 9 and 10.

One of the axes 203 of the upper die 202 is drivable by a driving device 207 having an arm 208. In this manner, the upper die 202 is 180 degree rotatable with respect to the axes 203 whereby a raised block 209 on the lower die 201 is clamped into a conformable recess 210 formed on the rotatable die 202. This corresponds to the operation of folding up the dough sheet. In the meantime, the dough sheet is cut into proper shape and size because of the tight engagement of the block 209 into the recess 210.

Figures 5, 6:
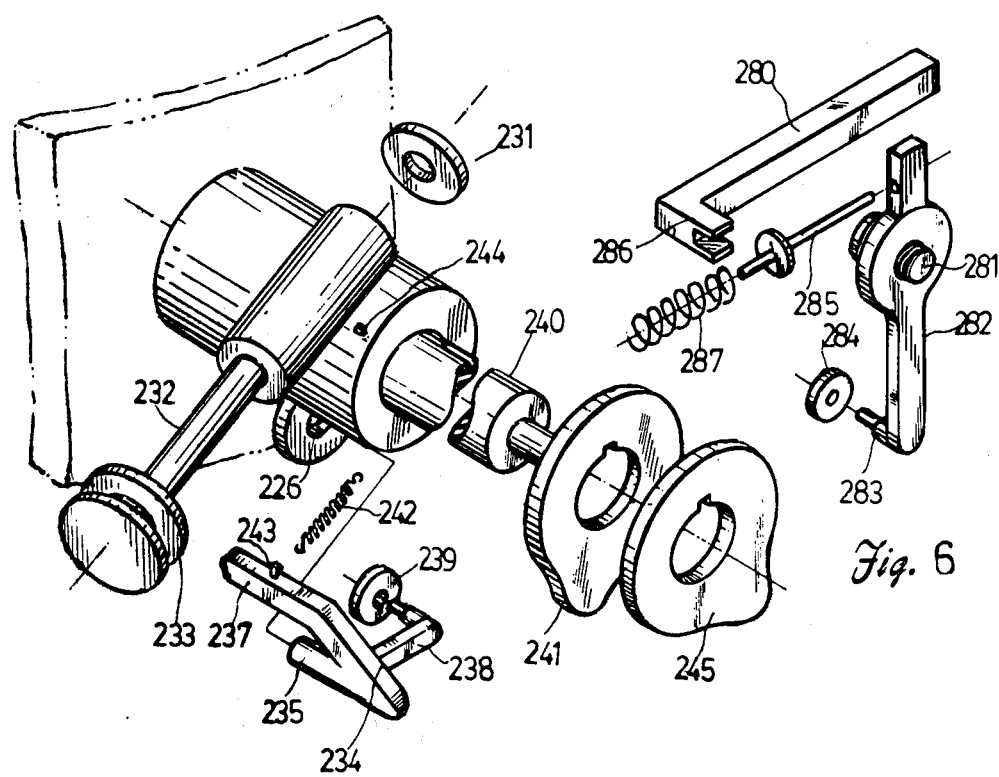
FIG. 5 is an exploded perspective view of a movable brush in the dumpling forming device.
FIG. 6 is an exploded perspective view of a rotating wheels control pin in the dumpling forming device.

The forming device according to the present invention has to be cleaned everytime a dumpling is formed before it is ready for the next. Referring to FIG. 2, as mentioned before, a fixed brush 22 is used to clean the surface of the forming device, and a movable brush 23 is further provided for cleaning the recess 210 and the block 209. An exploded perspective view of the movable brush 23 is illustrated in FIG. 5. Brush part 231 is attached to a handle 232 whose one end is formed into a ring groove 233 between two metal plates. A fork 234 whose one head 235 is secured to a seat 236 and another head 237 is received in the groove 233 is adopted for driving the movable brush 23. The fork 234 has an arm 238 with a wheel 239 mounted thereon. The wheel 239 is engaged with a cam 241 on a shaft 240 so that when the cam lobe of the cam 241 is in contact with the wheel 239 the fork 234 will be forced to rotate with respect to one end 235 thereof and whereby pull the handle 232 backward by its another end 237. In this manner, the movable brush can both rotate and reciprocate to cooperate with the motion of the forming device on the rotating wheels, and to clean the space between the raised block 209 and the recess 210. A spring 242 is connected between two screws 243 and 244 provided on the fork 234 and 244 provided on the fork 234 and the shaft 240 respectively for driving the movable brush 23 forward again.

FIG. 6 is an exploded perspective view of a rotating wheels control pin. The control pin 280 is mounted on the forming device and operated by a lever 282 having a screw 281 as the lever fulcrum. The front end 286 of the control pin is in the form of a fork drivable by a pushing bar 285 connected at the upper end of the lever 282. The lower end of the lever 282 is bent into an arm 283 with a wheel 284 mounted thereon. The wheel 284 is engaged with a cam 245 shown in FIG. 5 so that when the cam lobe of the cam 245 is in contact with the wheel 284 the lever 282 can be rotated counterclockwise, whereby pushing the control pin 280 by means of the pushing bar 285 into a lateral motion. A spring 287 is used to restore the lever 282 to its original position.

Figure 7:
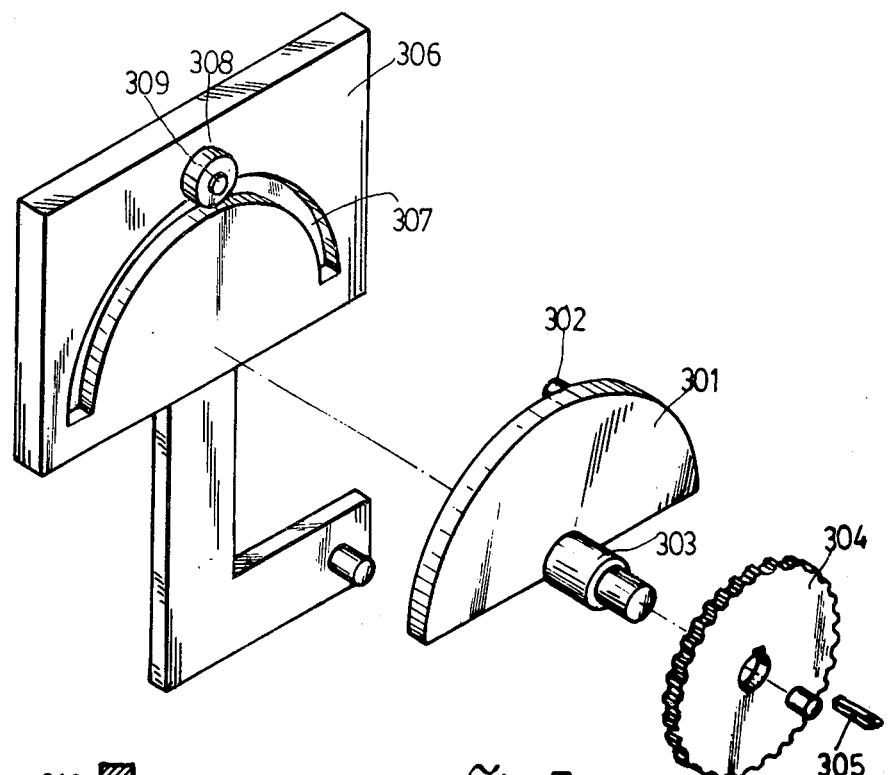
FIG. 7 is an exploded perspective view of the transmission mechanisms for a slidable plate in the dumpling making machine.
Figure 8:
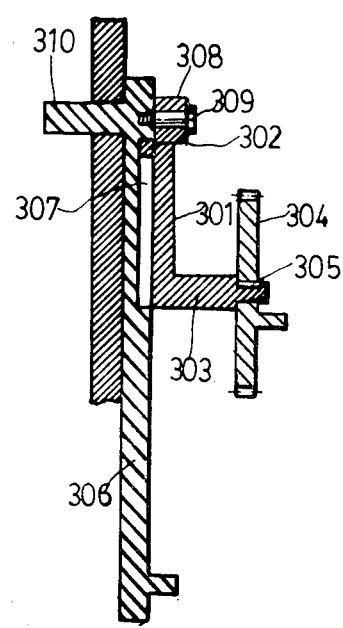
FIG. 8 is a vertical view of the transmission mechanisms in FIG. 7.

The vertical slide motion of the slidable plate 27 mentioned before is achieved by means of a special transmission mechanism according to present invention. An exploded perspective view and a vertical sectional view of the transmission mechanism is shown in FIGS. 7 and 8 respectively. A roller 301 in the form of a semi-circle is provided with a pin 302 located in the middle of the semi-circular periphery and protruding therefrom. The pin 302 is engageable with a semi-circular slot 307 formed on a plate 306. A gear 304 is fixed by another pin 305 to one end of the axis 303 of the roller 301. A small wheel 308 is further provided on the plate 306 and is rotatable with respect to its own axis 309. A connecting rod 310 is formed integrally with the plate 306 for vertically carrying the slidable plate 27 shown in FIG. 1 when the plate 306 performs a vertical slide motion. The vertical slide motion of the plate 306 is enabled through the cooperation of the roller 301 with the semi-circular slot 307 on the plate 306. During the period in which the pin 302 on the roller 301 is engaged in the slot 307, the wheel 308 is in contact with the surface of the roller 301. As a result, though the roller 301 is rotating, the plate 306 stands still. After the pin 302 reaches the left end of the slot 307, the pin 302 keeps going down with the rotation of the roller 301 forcing the plate 306 downward. Later, the pin 302 together with the plate 306 is carried up again after having passed its lowest position, and finally enters the slot 307 again. The plate 306 is then held still for another period of time at this highest position. The entire process repeats. It is to be noticed that the time interval during which the plate 306 is held still corresponds to the time required for switching from one forming device on the rotating wheels to another, and the timing of the entire process described above can be readily controlled by adjusting the rotating speed of the gear 304. The operation of the cutting device and the feed rod is thus also well controlled.

Figures 9, 10:
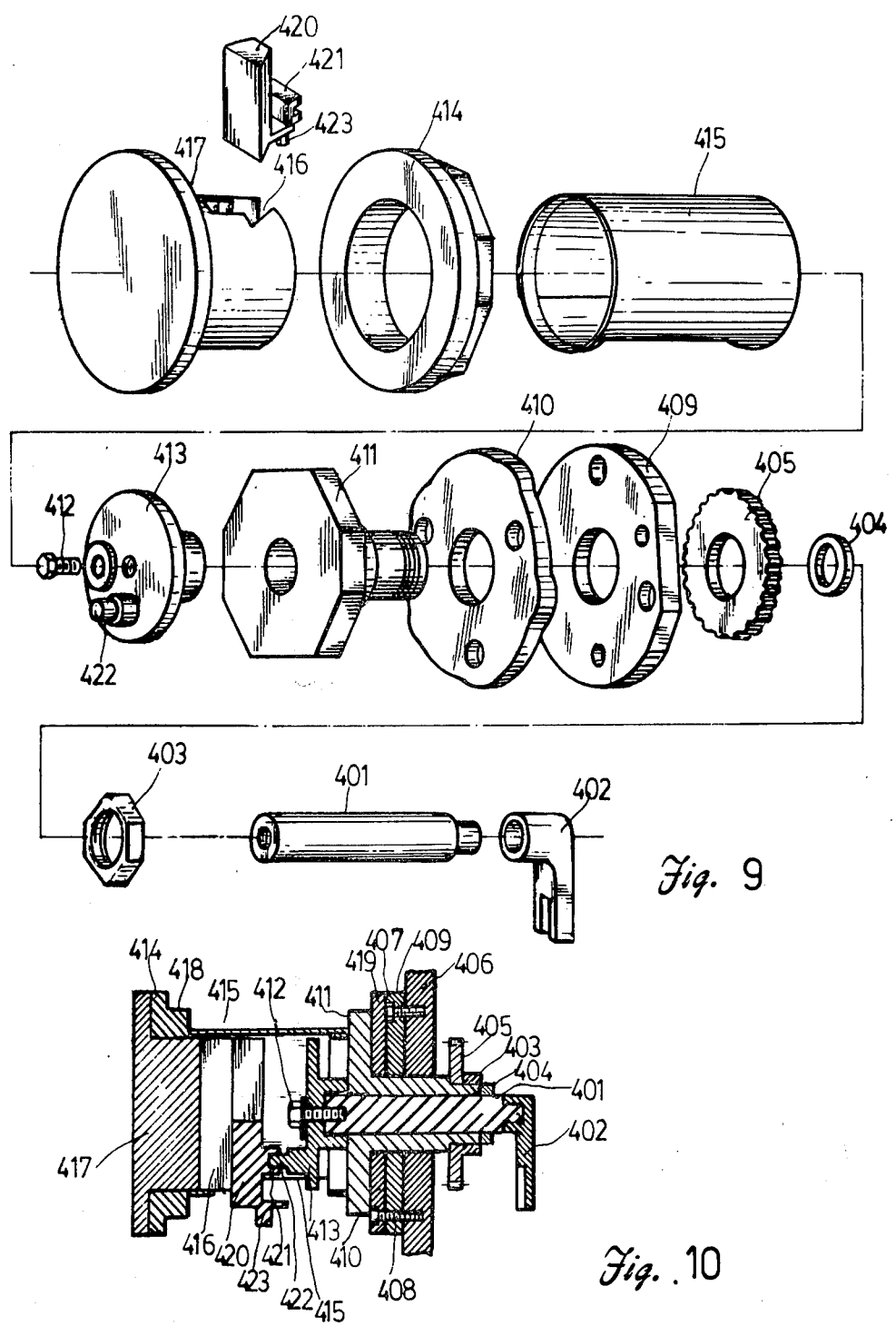
FIG. 9 is an exploded perspective view showing two octagon rotating wheels upon which a set of eight forming devices can be mounted.
FIG. 10 is a vertical sectional view of the rotating wheels in FIG. 9.

The rotating wheels upon which a plurality of forming devices are mounted are detailed in FIGS. 9 and 10. The rotating wheels are two octagon wheels 411 and 414. The shaft 401 of the wheel 411 is received at one end in a bearing 402. A roller 404 and a transmissing gear 405 are mounted on the shaft through a nut 403. These mechanisms are provided in a gear housing in the rear part of the dumpling machine. That is, they are located behind the wall 406 of the gear housing. Located in front of the wall 406 and mounted on the shaft 401 are two cams 409, 410 locked together by means of screws 407 and 408; the octagon wheel 411; and a wheel 413. Screw 412 is used to fix the wheel 413 to one end of the shaft 401. The wheel 414 having an octagon surface as a part thereof is synchronous with the wheel 411 and is installed in the front part of the forming device. A horizontal protection sleeve 415 opened at the lower part thereof is connected between the wheels 411 and 414 in order to prevent the flour on the dough sheets from falling into the shafts of the two rotating wheels. The wheel 414 is mounted on a fixed axis 417 having a wedge-shaped slot 416 formed thereon. A set of eight dumpling forming devices is mounted on the eight peripheral surfaces 418, 419 of the octagon wheels 411 and 414. A vertically slidable wedge block 420 is contained in the wedge-shaped slot 416 on the fixed axis 417. The vertical slide motion of the wedge block 420 in the slot 416 is caused by the slide motion of a pin 422 in a slot formed on a horizontal bar 421 of the wedge block when the wheel 413 is in rotation. The purpose of this vertical slide motion of the wedge block 420 is to push the completed dumpling out of the forming device into the dumpling collector 24 by means of an arm 423 to which the pushing rod 21 (shown in FIG. 2) is connected. It is also to be understood that the octagon shape of the rotating wheels is only a preferable embodiment of the present invention and in general any polygon-shaped rotating wheels with a corresponding number of dumpling forming devices mounted thereon can be adopted.

The automatic dumpling making machine according to the present invention is very efficient because the power required to operate the machine is only about 1 hp, and the machine can make dumplings in a sanitary and much faster way than human workers. The machine per se is compact and can be easily moved around to any convenient locations.

What is claimed is:

1. An automatic dumpling making machine substantially comprising a dough sheet holder for holding dough sheets to be used; a transmission mechanism for transmitting the dough sheets; a flour container for containing flour to be applied over the sheets; a stuffing hopper for storing stuffings; a stuffing control device for controlling the amount of stuffings to be fed into a sheet; a stuffing feeding device for feeding stuffings into a sheet; a hitting device for hitting the central part of the sheet to form a dent for receiving stuffings; two polygon-shaped rotating wheels; a plurality of dumpling forming devices mounted on the peripheral surfaces of said two polygon-shaped rotating wheels for folding up the dough sheet to form a dumpling; a pushing rod for pushing the finished dumplings out of the forming device; a fixed and a movable brush means for cleaning the dumpling forming device; and a dumpling collector and a dough sheet collector for collecting the finished dumplings and remaining dough sheets respectively, wherein each dough sheet is transmitted by the transmission mechanism to one of the dumpling forming devices where the sheet is hit by the hitting device to form a central dent and stuffings are fed into the dent from the hopper through the stuffing controller, and the forming device then folds up the dough sheet and cuts the same into a desirable shape and size, said movable brush comprising a brush part and a handle whose one end is formed into a ring groove for receiving one head of a fork, and the other end of the fork being secured to a seat, the fork having an arm with a wheel mounted thereon for engaging with a cam having a lobe so that when said cam lobe comes into contact with the wheel the fork is forced to rotate with respect to the fixed fork head and pull the brush backward, the brush being thereafter spring means pushed forward again.

2. The automatic dumpling making machine according to claim 1, wherein the transmission mechanism for dough sheets comprises two wheels oppositely arranged so that the thickness of the dough sheets passing therethrough is maintained constant.

3. The automatic dumpling making machine according to claim 1 wherein a wheel having a zig zagged surface and a stirrer means are provided in the flour container for stirring the flour contained therein and accumulating the flour on said zig zagged surface of said wheel so that when the latter is in rotation a layer of flour will be applied over the surface of the dough sheet.

4. The automatic dumpling making machine according to claim 1, wherein the stuffing controller comprises two intermeshing rollers oppositely arranged to form an upper and a lower part of the stuffing controller so that when the two rollers rotate with respect to each other a fixed amount of stuffings will be forced from the upper part into the lower part of the controller.

5. The automatic dumpling making machine according to claim 1, wherein the feeding device comprises a stuffing guide pipe for receiving stuffings and a vertically movable feed rod, said guide pipe being connected to a fixed support and said feed rod being connected to a vertically slidable plate and carried therewith to form a vertical motion for feeding the stuffings into the dough sheets.

6. The stuffing feeding device according to claim 5, wherein a stuffing remover having a claw portion in contact with the feed rod and capable of a vertical motion relative to the feed rod is further provided for completely removing the sticky stuffings from the feed rod.

7. The automatic dumpling making machine according to claim 1 wherein the dumpling forming device comprises a fixed lower die and a rotatable upper die locked together along one side, and the upper die is 180 degree rotatable with respect to the axes on the other side thereof so that a raised block on the lower die may be tightly clamped into a corresponding recess formed on the upper die for folding and cutting the dough sheet placed therein into a desirable shape.

8. The automatic dumpling making machine according to claim 1, wherein the polygon-shaped rotating wheels are substantially two synchronous octagon wheels with a protection sleeve mounted in between for preventing flour from falling into the shafts of the rotating wheels, and a set of eight dumpling forming devices is mounted on the eight peripheral surfaces of the octagon wheels.

9. The automatic dumpling making machine according to claim 1, wherein the pushing rod is connected to and drivable by a wedge block vertically slidable in a wedge-shaped slot on a fixed axis of one of the two polygon-shaped rotating wheels.

10. An automatic dumpling making machine substantially comprising a dough sheet holder for holding dough sheets to be used; a transmission mechanism for transmitting the dough sheets; a flour container for containing flour to be applied over the sheets; a stuffing hopper for storing stuffings; a stuffing control device for controlling the amount of stuffings to be fed into a sheet; a stuffing feeding device for feeding stuffings into a sheet; a hitting device for hitting the central part of the sheet to form a dent for receiving stuffings; two polygon-shaped rotating wheels; a plurality of dumpling forming devices mounted on the peripheral surfaces of said two polygon-shaped rotating wheels for folding up the dough sheet to form a dumpling; a pushing rod for pushing the finished dumplings out of the forming device; a fixed and a movable brush means for cleaning the dumpling forming device; and a dumpling collector and a dough sheet collector for collecting the finished dumplings and remaining dough sheets respectively, wherein each dough sheet is transmitted by the transmission mechanism to one of dumpling forming devices where the sheet is hit by the hitting device to form a central dent and stuffings are fed into the dent from the hopper through the stuffing controller, and the forming device then folds up the dough sheet and cuts the same into a desirable shape and size, said feeding device comprising a stuffing guide pipe wherein the feeding device comprises a stuffing guide pipe for receiving stuffings and a vertically movable feed rod, said guide pipe being connected to a fixed support and said feed rod being connected to a vertically slidable plate and carried therewith to form a vertical motion for feeding the stuffings into the dough sheets, the vertical slide motion of said slidable plate being effected by the cooperation of a semi-circular roller having a pin protruding therefrom with a plate having a wheel and a semi-circular slot provided therein so that when said pin is engaged in said slot the rotating roller will be in contact with the wheel while leaving the plate unaffected and when the pin is disengaged from the slot the plate will be carried therewith into a vertical motion.

* * * * *